3,510,438
MOISTURE SENSITIVE FILLERS IN POLYMER MATRIX WRITING ELEMENTS

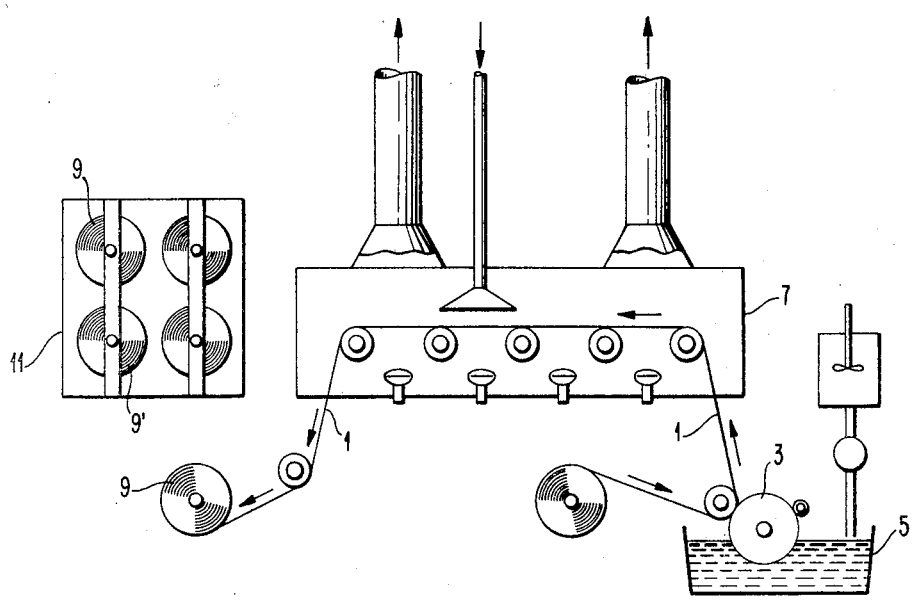

Hugh T. Findlay and William H. Horne, Lexington, Ky., assignors to International Business Machines Corporation, Armonk, N.Y., a corporation of New York
Continuation-in-part of application Ser. No. 635,864, May 3, 1967. This application Aug. 5, 1968, Ser. No. 750,295
Int. Cl. B41m 5/10; C08j 1/14
U.S. Cl. 260—2.5                                1 Claim

ABSTRACT OF THE DISCLOSURE

Polymer matrix writing elements, having high porosity and excellent ink release, include a porous polymer matrix, containing in its pores globules of a fluid transfer ink which is expressable under pressure and at least 10% by weight of a finely divided, particulate, organic, moisture sensitive filler material such as woodflour.

RELATED APPLICATION

This application is a continuation-in-part of our application, Environment Adapted Spongeous Transfer Medium, Ser. No. 635,864, filed May 3, 1967.

BACKGROUND OF THE INVENTION

The spongeous or matrix transfer technology is becoming fairly well understood in certain respects and is basically known in the art, as illustrated by U.S. patent application Ser. No. 536,557, filed Mar. 9, 1966, and now Pat. 3,413,184, issued Nov. 26, 1968 entitled, Transfer Medium and Method of Making Same, by Hugh T. Findlay and Kenneth H. Froman, and assigned to the same assignee as this invention is assigned. The matrix transfer layer is basically a layer of film forming resin having a porous structure with a fluid marking material held in those pores generally in the manner of a sponge. The matrix transfer material may be formed by several different known processes, and the product may include a supporting layer and other structures. Advantageously a particulate filler material is included in the matrix layer to stiffen the layer and also to aid in controlling the flow of ink from the material.

Although these transfer media give excellent results they are subject to certain problems. At the high loadings of filler materials required to produce a dry non-bleeding surface, some previously used fillers exhibit a thixotropic effect on the ink and may even form a colloidal suspension which retards the flow of ink from the ribbon to the point that sufficient intensity of printed characters is not obtained. Other filler materials, such as diatomaceous earth, while having acceptable ink releasing properties are abrasive and cause excessive wear on the printing elements especially at high loadings. A new class of fillers has now been found which can be employed at higher load levels than previously possible to give a balance of feeding properties, cleanliness, and ink release properties not heretofore obtained in matrix writing media.

BRIEF SUMMARY OF THE INVENTION

In accordance with the invention there is provided a polymer matrix transfer element comprising a polymer matrix layer containing a plurality of pores said pores being at least partially filled with globules of fluid marking material which is expressable from the pores under pressure and at least 10% by weight of said layer of a finely divided, particulate, organic, moisture sensitive filler material.

DESCRIPTION OF THE DRAWING

The drawing is illustrative of a preferred process for forming a novel transfer medium of the invention.

DETAILED DESCRIPTION

The transfer media here described are generally made in accordance with the processes described in the above mentioned application, Ser. No. 536,557 now Pat. 3,-413,184. With the exception of the filler material the body of the matrix or spongy layer and the inks employed are the same as those described for example in Pat. 3,413,184 and include polymers such as polyamide, polycarbonate, polyethylene, etc. The inks are conventional and comprise pigments dispersed in an oily ink vehicle.

The fillers of the invention are organic non-abrasive, finely divided particulate materials which are moisture sensitive. These include, for example, cellulose, methyl cellulose, hydroxyethyl cellulose, hydroxymethyl cellulose, polyvinyl alcohol, gelatine, etc. The cellulosic materials employed can be synthetic or derived from various natural products such as cotton and woodflour. The fillers are employed in sufficient amounts to give the desired degree of porosity, surface dryness, and strength to the matrix layer. At least a minimum of about 10% by weight of the filler based on the weight of the matrix layer is required whereas amounts above 35% by weight may shown a decrease in print intensity. The preferred range is from about 15% to about 35% by weight of the matrix layer.

The fillers of the invention not only provide a non-abrasive transfer element but the element exhibits a surprisingly high percentage of porosity. This porosity is higher than the amount expected just by the inherent porosity of the filler particles themselves. The reason for this is not entirely understood but it is believed that it is due to the moisture sensitive nature of the filler materials of the invention. Good print intensity is obtained because, although the filler material provides a highly porous structure which can absorb and hold large amounts of ink and moisture, no tendency was found to form a colloidal suspension at high filler loadings which has been found to retard the ink flow using other fillers at comparable levels. Therefore, rather than reducing the ink release properties by high filler loadings it surprisingly has been found that the ink releasing properties are actualy increased when the fillers of the invention are employed in the manner described.

The foregoing and other objects, features, and advantages of the invention will be apparent from the following examples wherein parts are parts by weight unless otherwise indicated.

EXAMPLE 1

The drawing illustrates the coating process which is conveniently employed and which is also shown in Pat. 3,413,184. The following example utilizes woodflour as the filler. The substrate of the drawing is a six and one-half pound rag, carbonizing tissue paper (a product of Crane Company). The liquid blend of raw materials containing nylon dissolved in ethyl alcohol and also dispersed marking material with an oily vehicle for the marking materials, is applied by roller 3 from reservoir 5 directly onto the tissue paper 1. Expulsion of the solvent, the ethyl alcohol, is accomplished in drying chamber 7. A backing layer of nylon having a dry thickness of 0.0005" is applied after first passing all of the paper 1 through the applicator while applying and solidifying the transfer material onto it, and then moving paper 1 as a bulk roll 9 to the start of the coater and passing it through the coater once again, this time with applicator 3 applying pure nylon in an ethyl alcohol and water mixture from reservoir 5 onto the top of the matrix transfer material layer. The transfer material was made by the following steps.

Step 1

The liquid ink of ingredients as shown in the immediately following table are ground together by successive passes through a roller mill until a fineness of grind less than 1.0 is obtained on the Hegmann fineness of grind gauge.

Liquid ink: Wt. percent
Black pigment 1686 dye and carbon black composition Dye Specialities Company __ 6.0
2451L black pigment dye and carbon black composition Paul Uhlich & Company ___ 10.0
Nigrosine oleate (1 part by weight Nigrosine base N) (2 parts by weight oleic acid) __ 63.0
Methyl violet base E. I. du Pont de Nemours and Co. _____ 3.0
Ohopex R-9 Ohio Apex Company _____ 18.0

Total _____ 100.0

Step 2

Sixteen parts by weight of liquid ink as prepared in Step 1 is mixed with six parts by weight of Superfine woodflour (product of Composition Materials Co.). This mixture is allowed to stand for at least twenty-four hours to thereby assure high saturation of the liquids into the woodflour.

Step 3

Eight parts by weight of Zytel 61 nylon (product of E. I. du Pont de Nemours and Co.) is dissolved in 70 parts Jaysol denatured ethyl alcohol (product of ANSCO).

Step 4

The ink and woodflour of Step 2 is thoroughly stirred into the nylon-ethyl alcohol solution of Step 3, thus yielding a raw material blend to form the transfer layer as follows:

Transfer layer blend: Wt. percent
Jaysol (Denatured ethyl alcohol product of ANSCO) _____ 70
Nylon (Zytel 61 product of E. I. du Pont de Nemours and Co.) _____ 8
Woodflour (Superfine—product of Composition Materials Co.) _____ 6
Liqiud ink (see above formula) _____ 16

Total _____ 100

The transfer layer blend is applied to the 6½ pound rag tissue by roller 3 as above described in amounts sufficient to form a dried film 0.0018 inch thick. The dried bulk roll of paper carrying the transfer layer formed is then moved to the start of the coater and then passed through the coater once again.

On this second pass, a blend of 8 parts by weight of the Jaysol denatured ethyl alcohol, 2 parts by weight water, and 2 parts by weight of the Zytel 61 nylon is applied by roller 3 to the dry, top surface of the matrix transfer layer, in quantities so that the caliper of the final matrix transfer medium, including the matrix transfer layer and the support layer, is approximately 0.0023 inch.

A composite is thus formed of a pure nylon supporting layer on the matrix transfer layer, with the matrix layer directly on the tissue paper substrate. As a part of this formation, the paper substrate 1 with the composite on it has been wrapped into a large, bulk roll 9. This moderately tight bulk roll is then placed in an environment control chamber 11 of any convenient construction along with similar rolls 9'. Then the bulk rolls 9 are treated for 72 hours at 90 degrees Fahrenheit and 90 percent relative humidity. This environment is selected because it is as conducive to absorption of moisture as the most such conducive environment encountered during normal use. Further storage of the wrapped roll 9 at normal room temperatures and conditions is recommended prior to stripping from substrate 1 for use, but essentially no further treatment is necessary. The transfer medium is then peeled from the paper substrate and cut and preferably wound into a number of individual typewriter ribbons, all essentially as described in Ser. No. 536,557.

EXAMPLE 2

The following series of preparations illustrates the change in free pore space achieved when using the moisture sensitive fillers of the invention as compared to previously used non-moisture sensitive fillers in polymer matrix writing elements. Four different fillers were employed, two of which were moisture sensitive fillers according to the invention, woodflour and powdered gelatin and two of which were non-moisture sensitive materials, Bentone 34 (organic derivative of montmorillonite clay) and diatomaceous earth. Transfer media were prepared at three filler loading levels for each of the four fillers according to the formulation in Table 1.

TABLE 1.—WEIGHT PERCENT

| | | | |
|---|---|---|---|
| Polyamide (nylon) | 33.3 | 30.4 | 28.6 |
| Ink | 50.0 | 46.2 | 42.8 |
| Filler | 16.7 | 23.3 | 28.6 |

The ink formulation was as follows:

Component: Percent by weight
Black Toner 1686 dye treated carbon black from Dye Specialities Company _____ 6.0
Black Toner 2451L dye treated carbon black from Paul Uhlich & Company _____ 10.0
Nigrosine oleate (1 Nigrosine base N:2 oleic acid) _____ 63.0
Methyl violet base dye stuff from Du Pont Chemical Company _____ 3.0
Ohopex R-9 mixed octyl esters of oleic acid from Ohio Apex Company _____ 18.0

The above ink ingredients were mixed together and milled on a three roll, roller mill until a fineness of grind measurement of less than one mil on the Hegmann Fineness of Grind gauge was obtained with the majority of particles having a particle size of approximately .1 mil.

Each sample of ink, polyamide, and filler were milled on a Szegvari attriter for thirty minutes. Hand drawdowns were made using a Garner Ultra applicator to prepare transfer media containing each of the four fillers at the three loading levels and the samples were dried in an air circulatig oven. In the case of the gelatin, the gelatin and ink were milled on a three roll roller mill for five passes prior to being put into the attriter. The polyamide was added to the mixture as a 12% by weight solution in denatured ethyl alcohol (Jaysol containing 5% denaturants consisting of traces of ethyl acetate, hexane, and water from Amsco Solvents). The draw-downs were permitted to age overnight. Portions were then cut from each of the samples and the weight and caliper of each writing element was determined. The actual density was calculated and compared to the theoretical density in order to determine the actual free pore space. The results are shown in Table 2.

TABLE 2

| Filler | Density of filler (g./cc.) | Theoretical density of element | Actual density of element | Percent free pore space |
|---|---|---|---|---|
| Bentone 34 | 1.80 | | | |
| I | | 12.36 lb./mil | 11.34 lb./mil | 8.25 |
| II | | 12.93 lb./mil | 11.70 lb./mil | 9.51 |
| III | | 13.32 lb./mil | 12.33 lb./mil | 7.43 |
| Diatomaceous earth | 2.60 | | | |
| I | | 13.79 lb./mil | 12.75 lb./mil | 7.55 |
| II | | 14.91 lb./mil | 13.11 lb./mil | 12.07 |
| III | | 15.75 lb./mil | 13.41 lb./mil | 14.86 |
| Wood flour | 1.50 | | | |
| I | | 11.84 lb./mil | 10.15 lb./mil | 15.11 |
| II | | 12.20 lb./mil | 9.59 lb./mil | 21.39 |
| III | | 12.41 lb./mil | 9.97 lb./mil | 19.64 |
| Gelatin* | 1.40 | | | |
| I | | 11.66 lb./mil | 9.82 lb./mil | 15.78 |
| II | | 11.95 lb./mil | 9.96 lb./mil | 16.65 |
| III | | 12.11 lb./mil | 9.89 lb./mil | 26.58 |

*The density used for gelatin in the calculations (1.40 g./cc.) is a minimum value. Therefore, the free pore space values for gelatin are conservative.

The moisture sensitive fillers as reported in Table 2 consistently showed a greater percentage of free pore space as compared with the non-moisture sensitive fillers. Although the diatomaceous earth showed an increase in free pore space with increased amounts of filler, it was still below that obtained at the lowest woodflour or gelatin loading. In order to obtain the amount of free pore space comparable to even the lowest moisture sensitive filler loadings, it was necessary to use an amount 28.6% by weight of the material whose abrasive properties at this loading makes it impractical for use in a transfer element due to the eroding effect on the printing elements and type dies. The print intensity produced by the samples containing the moisture sensitive fillers when struck by a type dye was visibly greater with better character fill than that produced by the inorganic non-moisture sensitive filler containing samples at comparable levels.

It is believed that the moisture sensitivity and the relatively larger amounts of free pore space exhibited by the fillers of the invention result in the optimum balance of feeding properties, cleanliness and ink release properties which are obtained. The large amount of free pore space results in relative dryness and cleanliness during the handling of the ribbon. This property is further enhanced by the process described in the parent application Ser. No. 635,864. Apparently, the free pore space also increases the ability of the writing element to release ink under pressure. This ability is high even at high filler levels which would normally be expected to decrease ink release due to the formation of either a colloidal or thixotropic suspension and the normal wicking action of a porous filler.

In connection with the above, it has been observed that, in fact, there is an optimum loading of moisture sensitive filler above which the print intensity starts to decline at very high loadings of woodflour when keeping the weight of ink and polymer material constant. The following example illustrates the change in print intensity using three different loadings of woodflour.

EXAMPLE 3

Several transfer media were prepared using formulation as shown in Table 3 using the same procedure, ink formula preparation and sample preparation which was followed in Example 2.

TABLE 3

| Components | Formula | Formula B | Formula C |
|---|---|---|---|
| Polyamide | 1.98 lbs. (32.0%) | 1.98 lbs. (27.2%) | 1.98 lbs. (19.0%) |
| Woodflour | 0.41 lbs. (6.6%) | 1.48 lbs. (20.4%) | 4.62 lbs. (44.4%) |
| Ink | 3.81 lbs. (61.5%) | 3.81 lbs. (52.5%) | 3.81 lbs. (36.6%) |
| Total coat wt | 6.20 lbs | 7.27 lbs | 10.41 lbs |
| Print intensity | 92 | 134 | 100 |

The print intensity determinations shown in Table 3 were made by cutting a portion of each transfer element sample to a typewriter ribbon size and placing it in a conventional typewriter and then determining the intensity of print on the copy sheet using a microdensitometer. It can be seen from the results that a startling increase in print intensity occurred by increasing the woodflour loading from 6.6% to 20% by weight while a decline in print intensity occurred at the extremely high of 44.4% by weight filler loading. The optimum filler loading based on the amount of ink and polymer matrix material can be easily determined for each filler material and has been found to range from about 15 to 35% by weight. Filler loadings at these levels using inorganic materials have been found as illustrated in Example 2 above to either give a decrease in print intensity and/or result in highly abrasive ribbons which cause excessive wear on the print or type elements.

EXAMPLE 4

A transfer medium was prepared using Formula B of Example 3 except that finely divided methyl cellulose was employed as the filler material rather than woodflour. The resulting transfer element gave excellent ink transfer properties.

EXAMPLE 5

A transfer medium was prepared according to the procedure and Formula B of Example 3 except that finely divided cotton fiber was used as the filler material in place of the woodflour. The resulting transfer medium had handling strength and ink transfer properties comparable to the woodflour containing transfer medium.

The above has decribed a superior polymer matrix writing element obtained by employing organic moisture sensitive filler materials rather than the previously used inorganic non-moisture sensitive fillers. The organic materials are non-abrasive and due to their moitsure sensitive properties have been shown to result in transfer media having a high amount of free pore space. The media have good strength and stiffness properties and yet, surprisingly, when employed as described herein even at relatively high filler levels actually act to increase rather than decrease the ability of the transfer media to transfer ink to a copy sheet. The result is transfer media which is superior to those heretofore obtainable using prior art fillers.

While the invention has been particularly shown and described with reference to preferred embodiments thereof it will be understood by those skilled in the art that the foregoing and other changes in form and details may be made therein without departing from the spirit and scope of the invention.

I claim:

1. A polymer matrix transfer element comprising a polymer matrix layer containing a plurality of pores said pores being at least partially filled with globules of a fluid marking material which is expressable under pressure and said element containing from about 10 percent to 35 percent by weight of said layer of a finely divided, particulate organic, moisture sensitive filler material selected from the group consisting of gelatin and polyvinyl alcohol.

References Cited

UNITED STATES PATENTS 2,711,375 6/1955 Sandberg _____ 117—36.1
3,306,867 2/1967 Popiolek _____ 117—36.1
3,413,184 11/1968 Findlay et al. _____ 117—36.1

MURRAY KATZ, Primary Examiner

U.S. Cl. X.R.

117—36.1, 36.4; 161—160